UNITED STATES PATENT OFFICE.

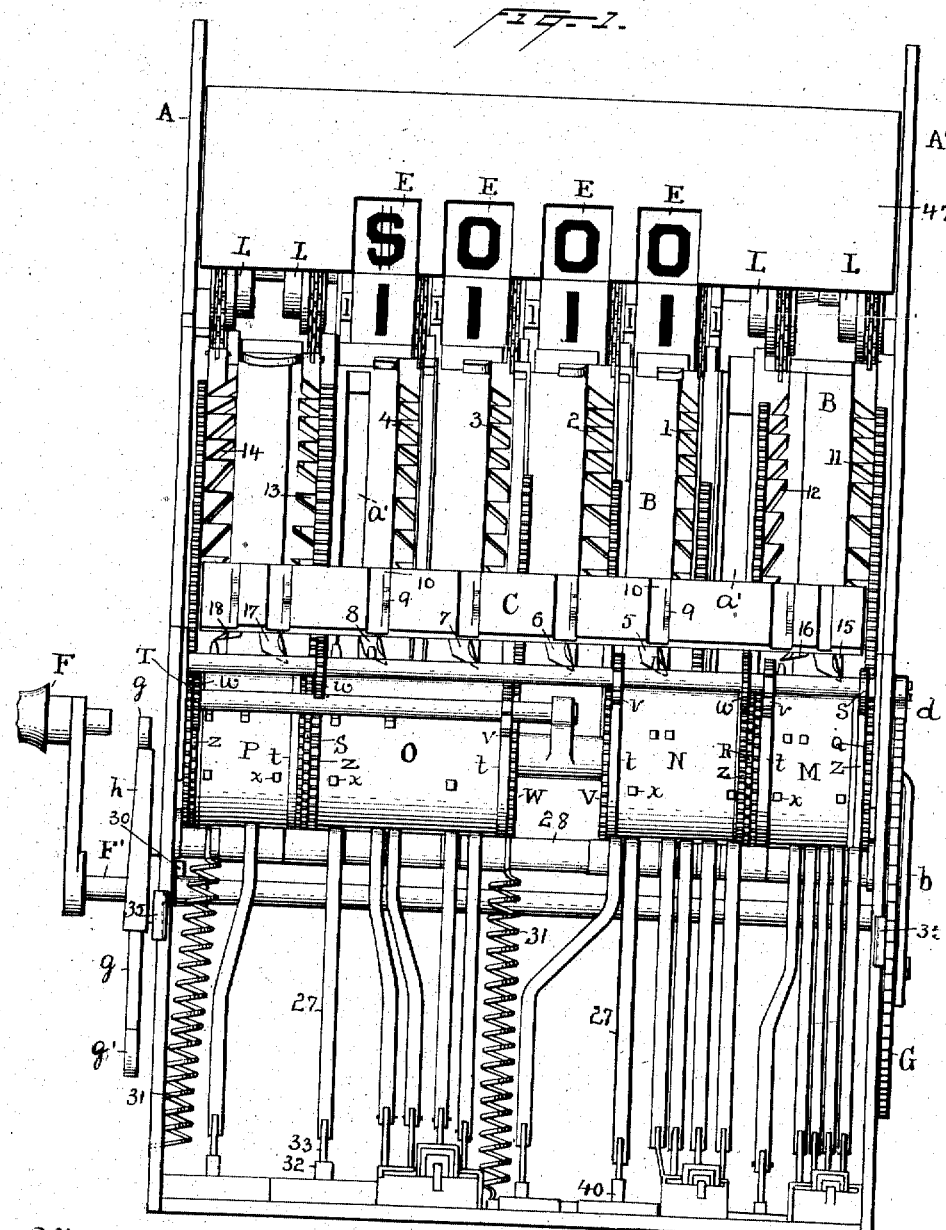

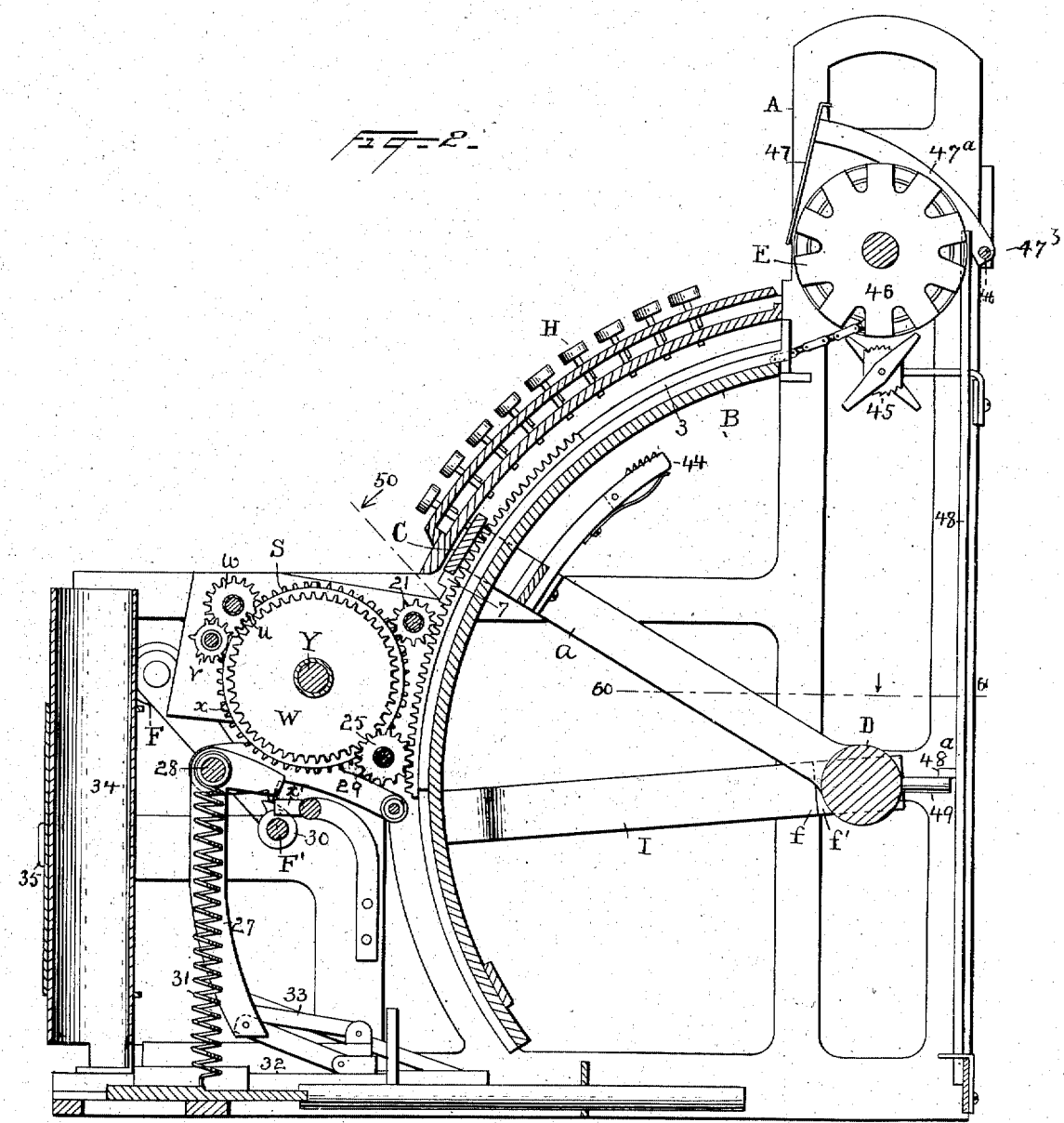

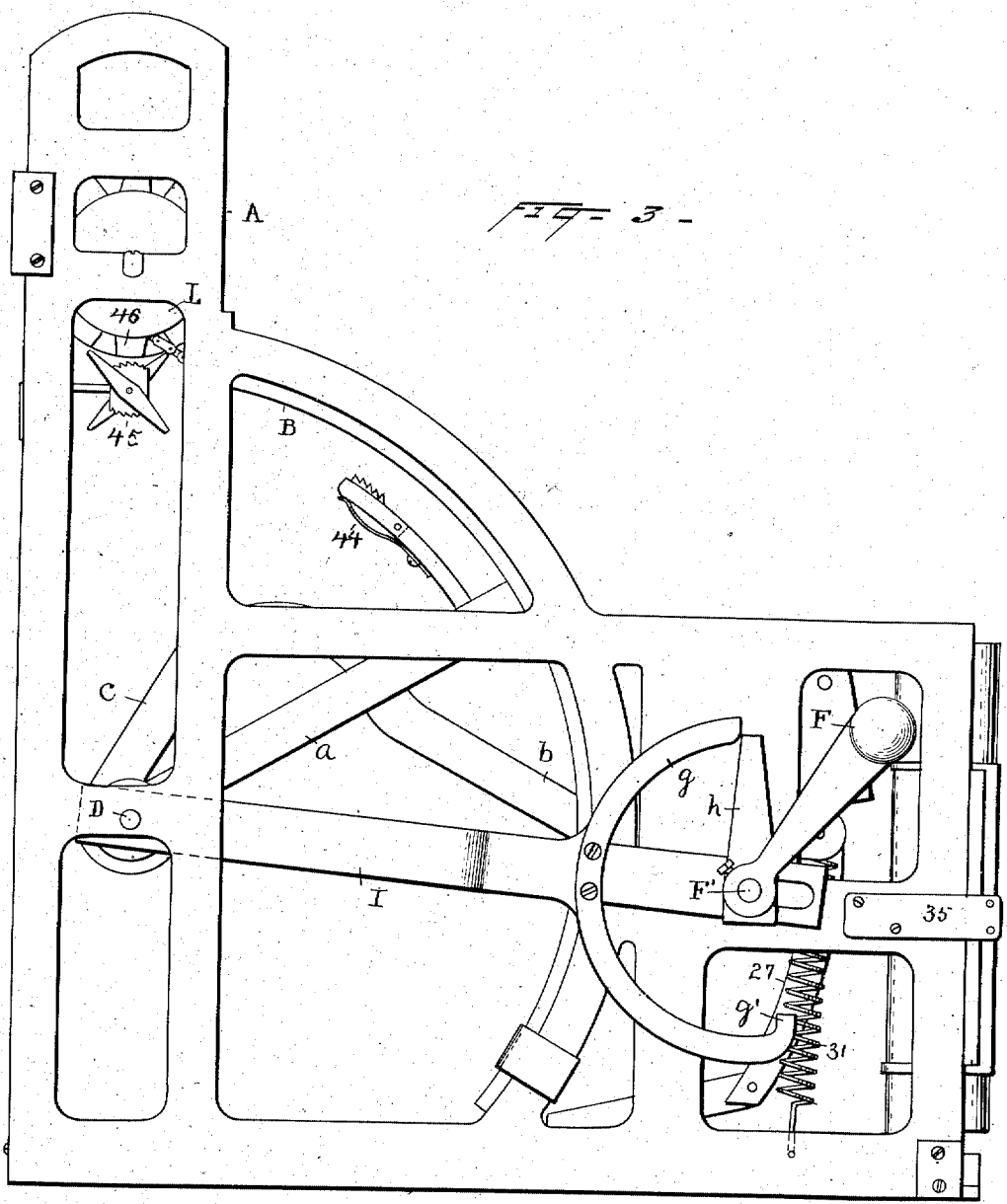

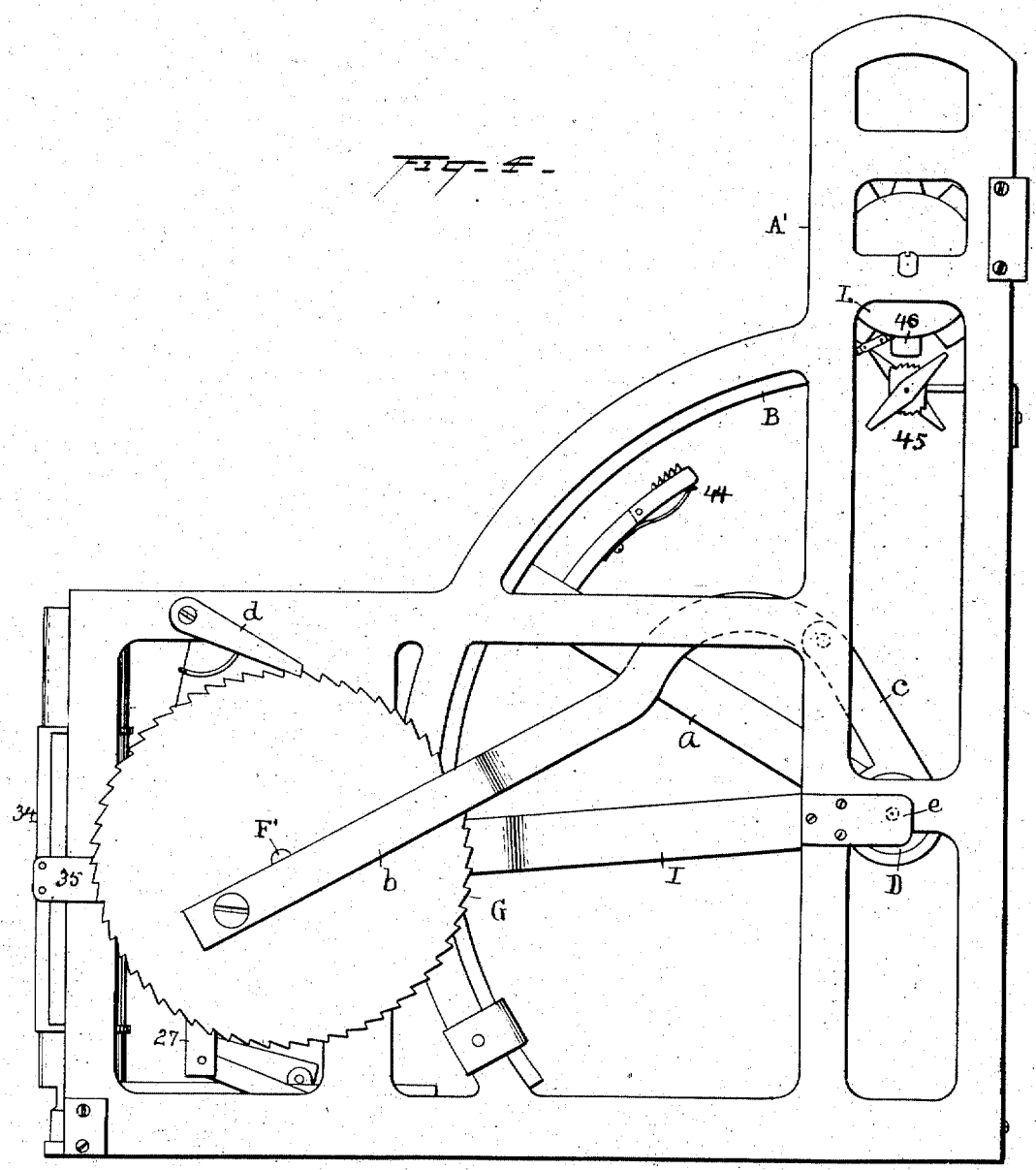

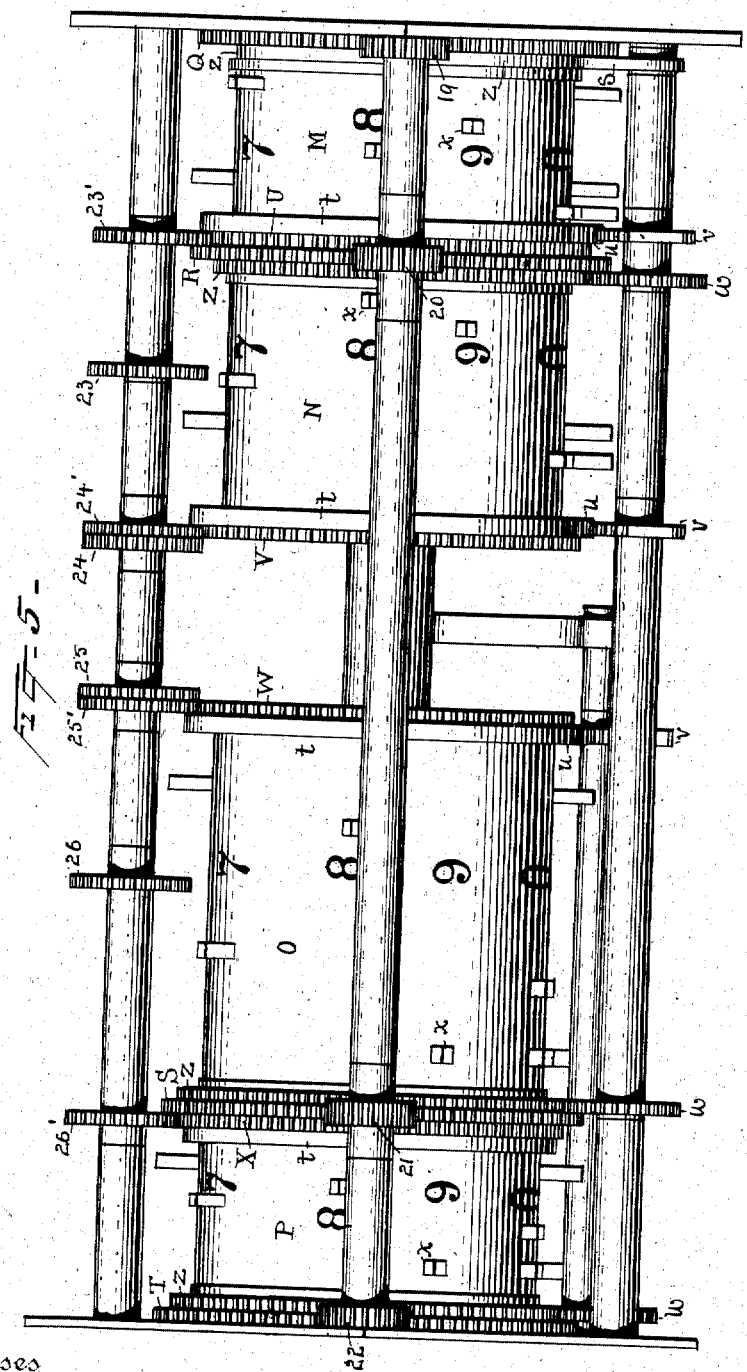

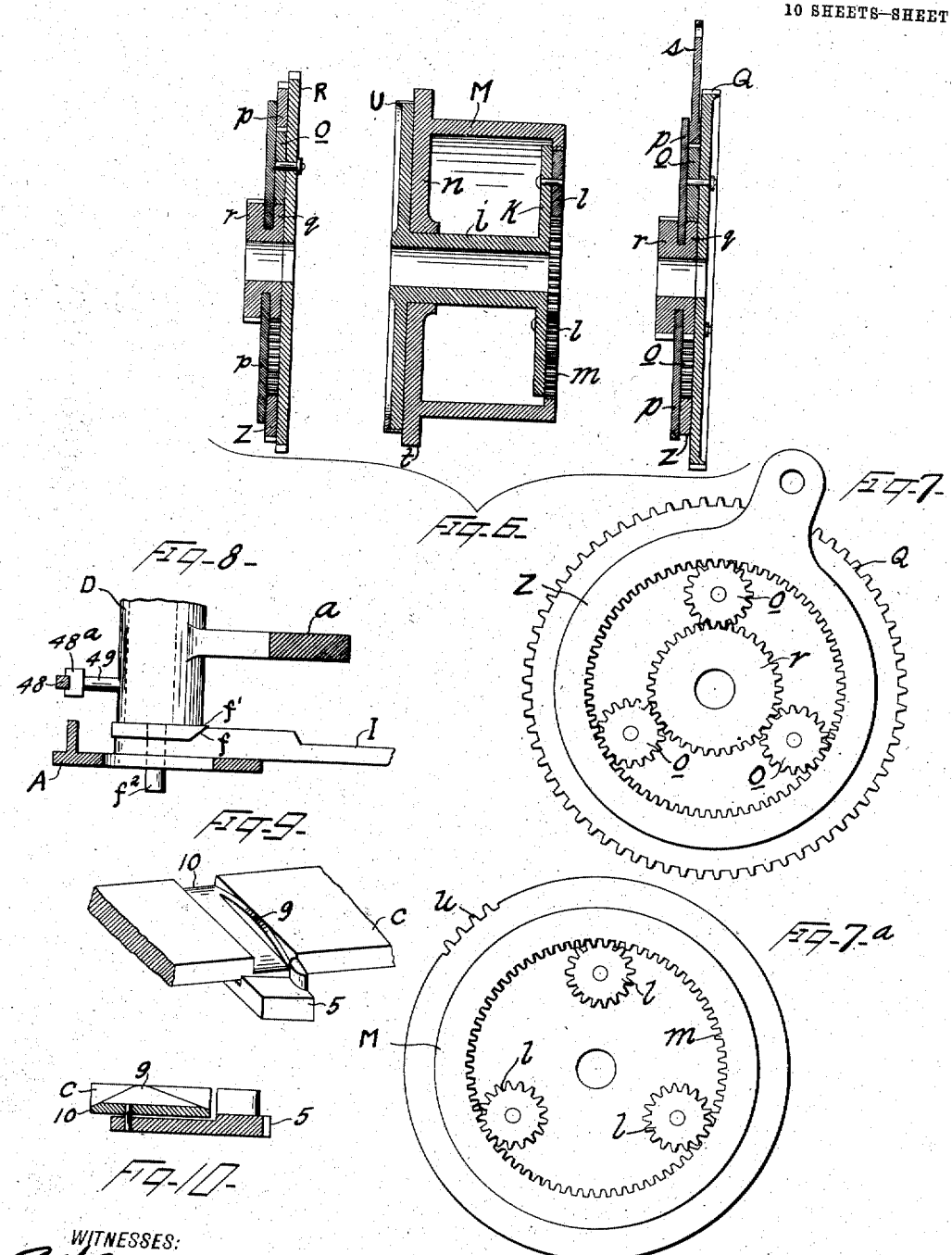

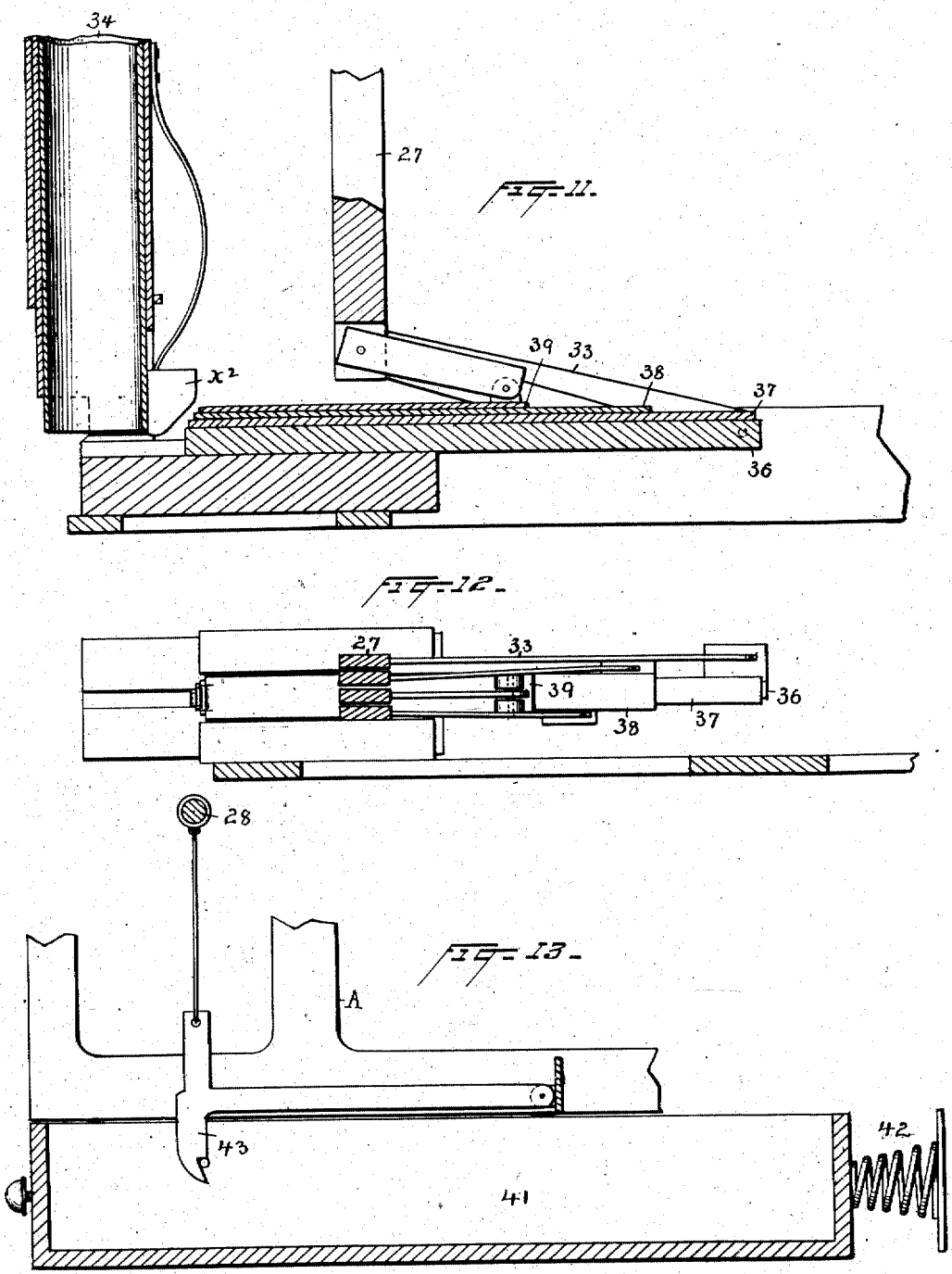

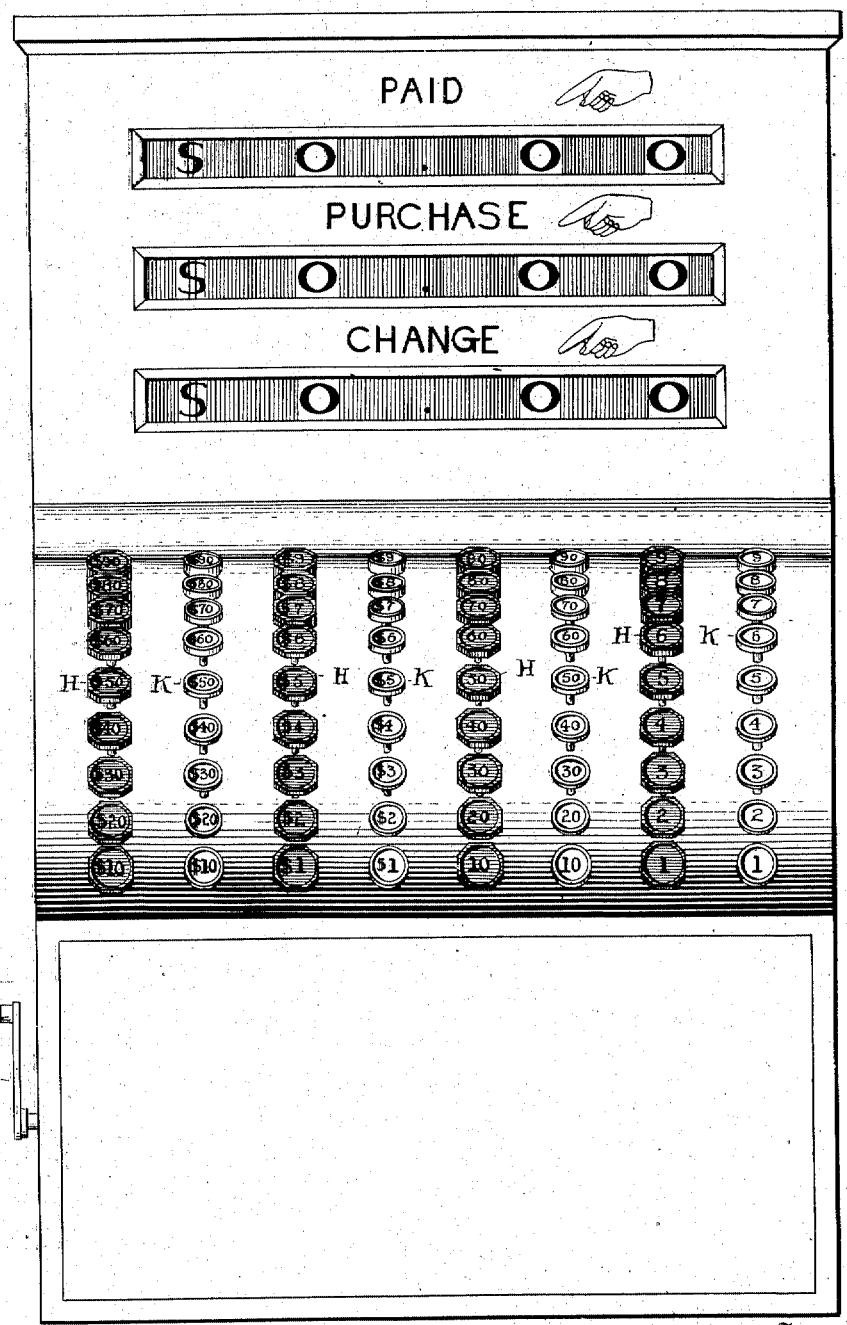

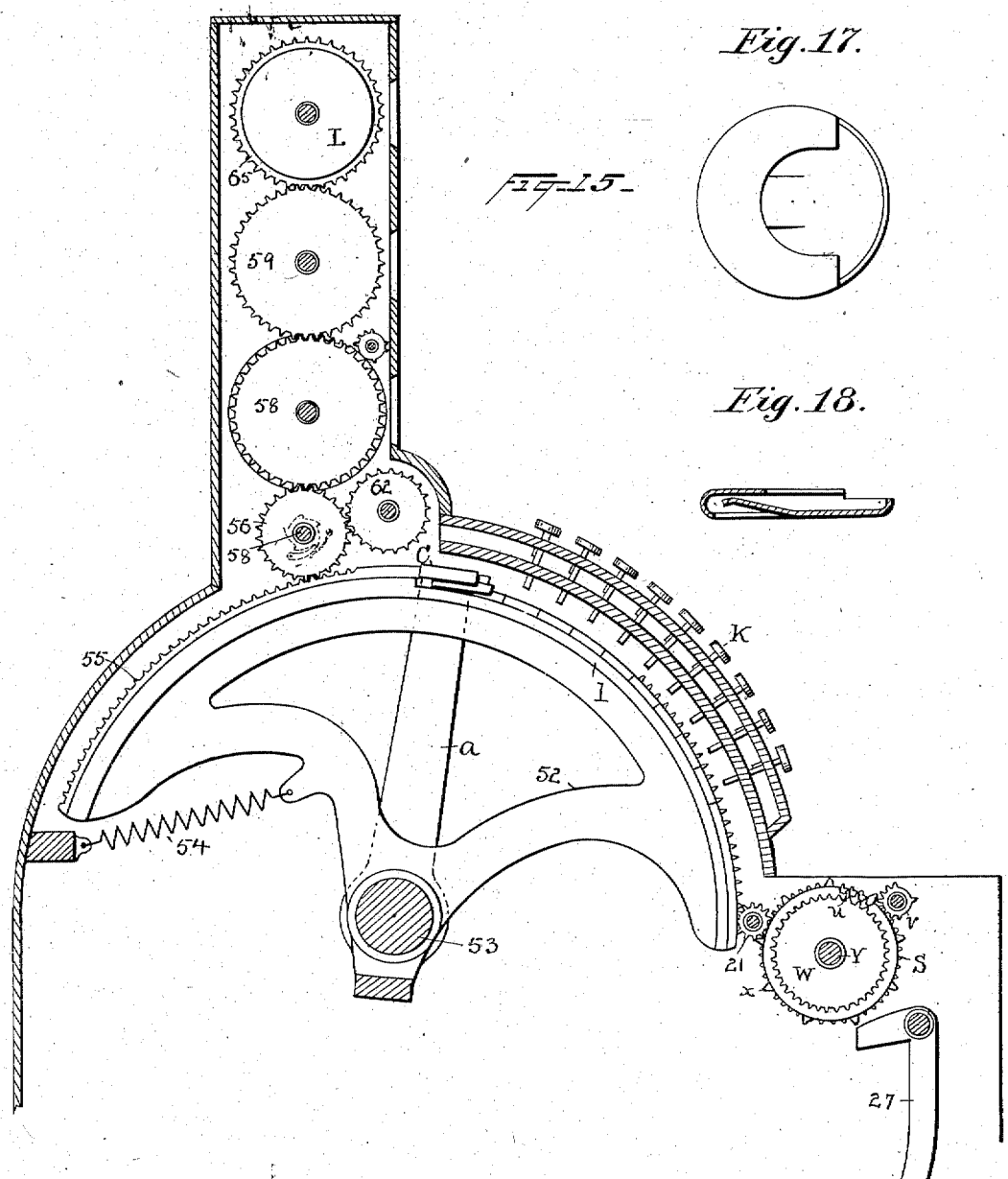

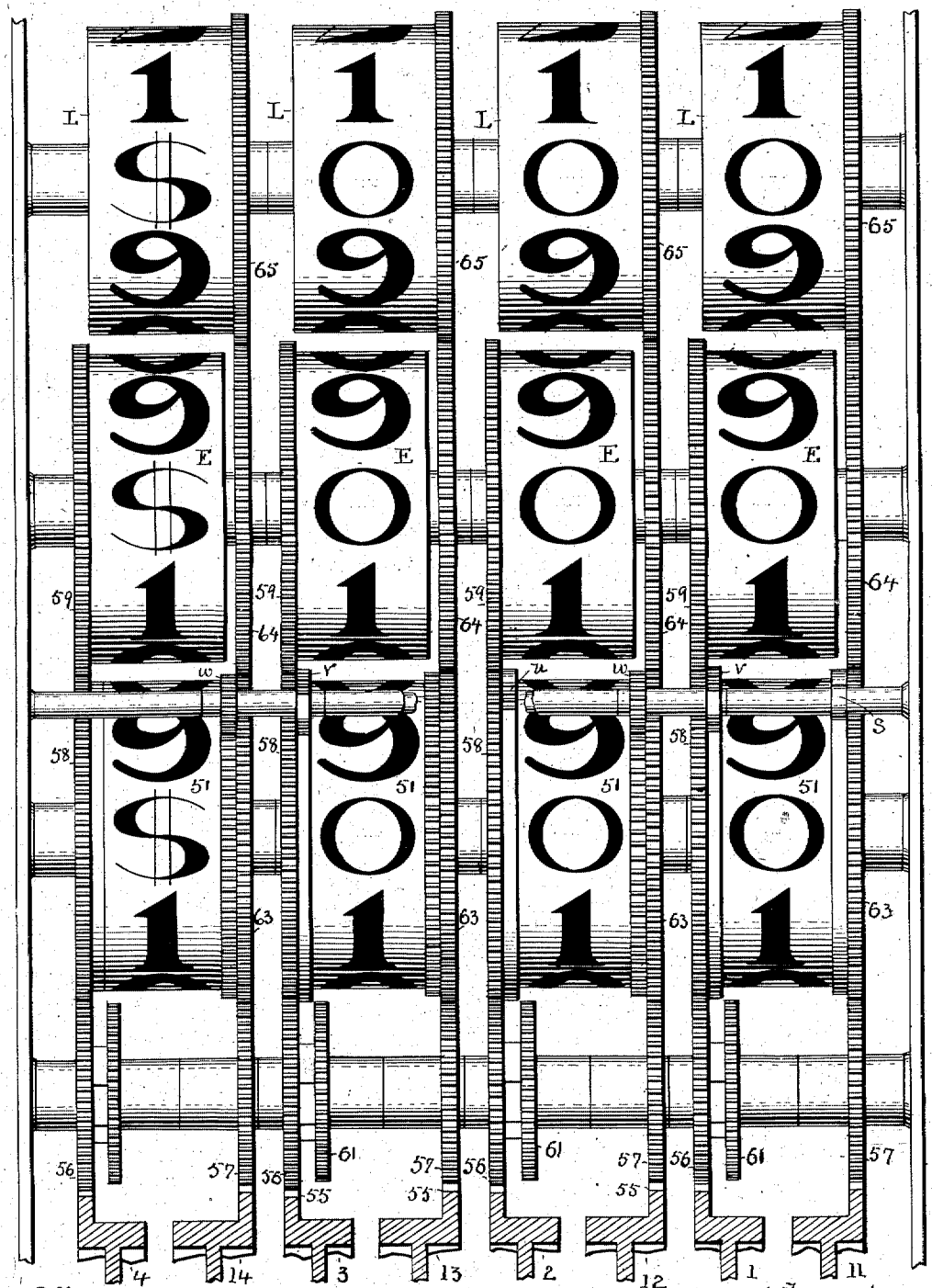

FRANCIS C. OSBORN, OF DETROIT, MICHIGAN, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH INDICATOR AND REGISTER.

982,853.      Specification of Letters Patent.      Patented Jan. 31, 1911.

Application filed May 2, 1896. Serial No. 589,946.

*To all whom it may concern:*

Be it known that I, FRANCIS C. OSBORN, a citizen of the United States, residing at Detroit, in the county of Wayne and State of Michigan, have invented a certain new and useful Improvement in Cash Indicators and Registers, of which the following is a specification.

The principal object of my invention is to improve the machine described in the patent issued to present applicant August 27, 1907, #864,185, wherein there are combined with mechanism for indicating and registering sales, an indicator of the change to which the purchaser is entitled, and a change-maker, or mechanism by means of which the machine selects from proper receptacles coins or bills carried in round shallow boxes, or both, amounting to the change required.

My improved machine embodies means for indicating the amount paid by the purchaser, in addition to the indications of the sale and the change, so that the entire transaction will be indicated.

In the machine of the application referred to, by reason of the limitations imposed by the computing mechanism, it was necessary to actuate the wheels of that mechanism successively to perform the different steps in the subtracting operation, and consequently the operation of the machine was somewhat complex. In my improved machine, however, I employ a computing mechanism (based upon the principle of that described in my Patent No. 484,814, granted October 25th, 1892) wherein the three sets of actuators (the "sales" or subtracting actuators, the "paid-in" or adding actuators, and the carrying actuators) are capable of simultaneous action so as to produce, by one movement, the required indication of change. This enables me to operate the "paid-in" or adding actuators by mechanism similar to that which is employed to operate the "sales" or subtracting actuators, which mechanism, in the form of apparatus to which I have applied my invention, consists of toothed slides or segments, acted upon by pivoted dogs carried by a moving yoke or crosshead, which dogs are thrown into the teeth of the slides by the depression of keys. By this means the "paid-in" amounts are set up on the machine, as are the "sales" amounts, by the depression of properly marked keys, and the "paid-in" slides are operated simultaneously with the "sales" slides and by the same actuating mechanism. Where the indications are made on wheels, as I prefer to make them, the wheels indicating the amounts paid in can be connected with and operated by the "paid-in" slides, the same as the "sales" indicating wheels are connected with the "sales" slides, as described in the application referred to. The three sets of indicator wheels referred to, viz: the "paid-in" indicator, the "sales" indicator, and the "change" indicator, are preferably located in the order named, upon the front of the machine at its top.

Instead of employing a separate actuator for moving the coin-expelling levers, as in the patent first referred to, my improved machine has these levers operated by the same prime actuator which moves the indicators and at the end of its movement. The compound coin-ejecting slides of my improved machine are differently constructed from those of the machine of the said patent in that the number of coins ejected is not made dependent upon the extent of withdrawal of the slides, but each compound slide is made in sections, arranged to slide one within the other, and each section is operated by a separate expelling lever, the adjustable end of the coin tube being raised the proper distance by the section of the slide as it advances by means of a beveled lug. I also provide, in my improved machine, a special arrangement of the expelling levers and selecting pins on the "tens" drum of the computing machine, by means of which the twenty-five cent coins are employed in making change from the "tens" section of the machine, without necessitating any connection with the "unit" section.

My improved machine is also designed to work in connection with a cash drawer, in which case the coin tubes may be removed from the machine and also the coin-expelling levers and slides, although these parts may remain and no coins be placed in the tubes. The cash drawer may be one which is thrown open by a spring, and when closed against the tension of the spring, is locked in a closed position by a latch which is lifted by the prime actuator of the machine, as it reaches the limit of its movement. When the cash drawer is used, the machine will indicate the change, without making it, and the change will be made by the clerk from the cash drawer in accordance with the indication which the machine furnishes.

My improved machine also embodies certain improvements applicable to cash indicators and registers of the type illustrated in my Patents No. 455,111, granted June 30, 1891, and No. 864,185, granted Aug. 27, 1907 which improvements may be employed on cash indicators and registers of this character, whether the same are provided or not provided with indicators for showing the paid-in amounts and the change and with mechanism for making the change. These improvements relate in part to the prime actuating mechanism for moving the yoke or crosshead, which enables a rotary motion to be employed for the operating handle instead of a reciprocating motion, and in part to a construction whereby the keys may be depressed while the yoke or crosshead is in its lowermost position, and will not be disturbed, nor will they themselves act upon the pivoted dogs during the rising motion of the yoke or crosshead. The last mentioned result is attained by giving the yoke or crosshead a lateral movement at the ends of its vertical movement, and providing it with proper channels through which the ends of the depressed keys pass without touching the yoke or other parts of the mechanism during the rising movement of the yoke.

In the accompanying drawings, Figure 1 is a front elevation of a machine embodying my invention, with the casing removed and also having the coin tubes removed; Fig. 2 is a central vertical section of the machine, with the key-board in position; Figs. 3 and 4 are elevations from opposite sides of the machine, with the casing removed; Fig. 5 is a plan view of the computing mechanism taken at the angle indicated by the dotted line and arrow 50 in Fig. 2; Fig. 6 is a sectional view of the unit section of the computing mechanism and the first element of the tens section, the parts being separated at two points for clearness of illustration; Fig. 7 is a side view of one of the adding wheels of the computing mechanism and cooperating mechanism; Fig. 7ª is a side view of one of the computing drums and driving pinions; Fig. 8 is a sectional view on line 60—60 in Fig. 2, showing the wedge for shifting the crosshead laterally; Fig. 9 is a perspective view of a portion of the crosshead and one of the pivoted dogs carried thereby; Fig. 10 is a sectional view of the parts shown in Fig. 9; Fig. 11 is a sectional view showing one of the compound coin-expelling slides and the coin tube coöperating therewith; Fig. 12 is a plan view of the compound slide, the coin-expelling levers being in section; Fig. 13 is a sectional view showing the cash-drawer; Fig. 14 is a front elevation of the machine, showing a somewhat different arrangement of the key-board and the indicators; Fig. 15 is a vertical section showing the principal elements of the machine of Fig. 14; Fig. 16 is a front view of the indicator wheels of this machine, showing their connection together and with the operating segments. Fig. 17 represents a top plan view of one of the bill receptacles which is similar to that shown in my aforesaid pending application, and Fig. 18 represents a vertical section through the same.

I will first describe the machine illustrated by Figs. 1 to 13 inclusive, and will then refer to the respects in which the machine shown in Figs. 14, 15 and 16 differs therefrom.

Referring to Figs. 1 to 13 inclusive: The frame in which the operative parts of the mechanism are mounted has upright side frames A A', between which is secured the curved backplate B, grooved to form curved races in which move the curved toothed slides, which are operated by pivoted dogs on the crosshead C, supported by arms $a$ from a shaft D, the arms $a$ working in slots $a'$ (Fig. 1) in the curved backplate B. 1, 2, 3 and 4 are the toothed slides of the first, second, third and fourth orders, which are connected at their upper ends by chains with the sale indicator wheels or drums E, which wheels are turned as the slides are moved downwardly, winding up springs within the drums, which turn the wheels backwardly to the zero position and raise the slides when the crosshead makes its return movement. These springs are not shown, but they may be arranged in any suitable manner, as, for instance, in my Patent No. 455,111, above referred to. The slides 1, 2, 3, 4 are those which are used in indicating and registering the amounts of the sales, and are referred to hereinafter as the "sales" slides or actuators. Instead of operating the crosshead C by the reciprocation of a lever, as in my former application before referred to and as in my Patent No. 455,111, I arrange the parts to be operated by a rotating handle F, which turns a shaft F', journaled in the side frames in front of the curved back plate B, and carrying on its end opposite to the handle a disk G, which is connected by a pitman $b$ and rocker-arm $c$ with the shaft D. The rotation of the shaft F' by the handle F causes a rocking movement to be given to the shaft D, and a reciprocating movement to the crosshead C up and down over the curved backplate B, the arms $a$ moving in the slots $a'$. The periphery of the disk G is provided with ratchet teeth, with which engages a pawl $d$ for preventing the backward movement of the parts.

The shaft F' is the prime actuator of the machine, from which all other parts receive their movement. The crosshead C carries pivoted dogs 5, 6, 7 and 8, which engage with the teeth of the sales slides 1, 2, 3, 4 in the downward movement of the crosshead, the dogs being thrown into engagement with the teeth of the slides by the stems of the sales keys H when such keys are depressed, such stems engaging with beveled lugs projecting forward from the heads of the dogs, as described in my former application and in my Patent No. 455,111. The downward movement of the crosshead C causes the beveled lugs on the dogs which travel in the path of any of the keys that are depressed to strike the stems of the keys, forcing the dogs into the teeth of the slides, after which the stems of the keys ride over inclines 9 on the crosshead C (see Figs. 9 and 10), which force the keys outwardly so that they will not engage the dogs on any future movement of the cross-head unless again depressed.

In order that the keys may be depressed while the crosshead C is in its lowermost position and before the crosshead is lifted, I provide for giving the crosshead, at each end of its reciprocating movement, a lateral movement, so that during the upward movement of the crosshead the stems of the depressed keys will not pass over the inclines 9, but will pass through channels 10 on the face of the crosshead and adjoining the inclines 9, without disturbing the position of the keys. To give the crosshead this lateral movement, the rockshaft D is mounted to slide in its bearings, being forced in one direction by a blade spring e (Fig. 4), and in the other direction by a sliding wedge f, acting upon another wedge f', adapted to move longitudinally with the shaft, but not to turn therewith (see Fig. 8). The wedge f is provided with a slot through which passes the pivot pin f² of the rock shaft D; the slot being long enough to permit the free movement of the wedge. This wedge is carried by a bar I, whose forward end terminates in a curved fork g, the lower prong of the fork being extended beyond the upper prong and turned inwardly to form a tooth g'. An arm h secured to the handle shaft F' engages with the curved fork g. In reaching the position of rest of the machine shown in Fig. 3, the arm h has engaged with the upper prong of the curved fork g, forcing the bar I to the rear, and sliding the main shaft D to the right (facing the machine), against the tension of the spring e. This movement carries the crosshead C to the right, bringing the channels 10 in line with the key stems. As the handle is moved, the arm h travels around the fork until the crosshead C reaches the upper limit of its movement, when the arm h strikes the tooth g' on the lower prong of the fork, drawing the bar I forward and permitting the shaft D and the crosshead C to be moved again to the left by means of the spring e. The continued rotation of the handle moves the crosshead C downwardly, bringing the beveled lugs on the pivoted dogs and the inclines 9 into contact with the stems of such keys as are depressed. The slots a' in the curved back-plate B, through which the arms a pass, are made wide enough to permit the lateral movement of the crosshead C. Adjoining the sales slides are similar toothed slides 11, 12, 13 and 14, with which engage pivoted dogs 15, 16, 17 and 18, carried by the crosshead C, in a manner similar to the dogs engaging the sales slides. The slides 11, 12, 13 and 14 are adapted to respond to the depression of keys K which represent the amounts paid in by the customers, and these slides are therefore hereinafter designated as the "paid-in" slides or actuators.

The paid-in slides, like the sales slides, are of four orders. For convenience, they may be located at the sides of the machine, two of the paid-in slides being at one side, and two at the other side, while the sales slides are between the paid-in slides, the sales keys and paid-in keys being similarly arranged; but any other arrangement of the keys and slides, such as the alternation of the sales and paid-in keys and slides, could be employed, as illustrated in Figs. 14 and 16. The upper ends of the paid-in slides are connected with the paid-in indicator wheels or drums L, just as the sales indicator wheels are connected with the sales slides, such wheels or drums being rotated by the downward movement of the slides through chain connections, and turned in the other direction as the slides are raised by means of springs in the same manner as the indicator wheels.

The sales slides and paid-in slides carry racks (Figs. 1 and 2), which operate the wheels of a computing mechanism, which indicates the amount of change, and also adjusts selecting pins for throwing the coin-expelling levers. The computing mechanism is shown as consisting of four drums, M, N, O, P, which have the digits marked thereon, these drums representing the first four orders of numerals. The unit drum M is turned in the direction to traverse from lower to higher figures by the unit paid-in slide 11, and is moved in the reverse direction, or from higher to lower figures, by the unit sales slide 1. Similarly, the tens drum N is moved to increase the indicated number and to decrease that number by the paid-in slide 12 and the sales slide 2 respectively. The hundreds drum O is likewise moved by the slides 13 and 3, and the thousands drum P by the slides 14 and 4; in other words, the paid-in slides act to set up on the drums the amount paid in by the purchaser, while the sales slides act to subtract from that sum the amount of the sale, the remainder being the amount of the change, it being understood that the carrying mechanism acts to carry from drums of lower to drums of higher order, moving the drums of higher order in one or the other direction according to whether the carrying is one of addition or one of subtraction, the addition carrying taking place when the drums are set back to the zero position. To understand how this is accomplished by a simultaneous movement in which the three sets of actuators (viz: the paid-in or adding actuators, the sales or subtracting actuators, and the carrying actuators) move together and produce their proper results without interference one with the other, reference should be had to the detail Figs. 5, 6 and 7, showing the computing mechanism. The racks on the paid-in slides engage, through pinions 19, 20, 21 and 22, with the paid-in or addition wheels Q, R, S, T, while the racks on the sales slides engage, through pinions 23 and 23′, 24 and 24′, 25 and 25′ and 26 and 26′, with the sales or subtracting wheels U, V, W, X, the racks engaging the pinions 23, 24, 25 and 26, which are fixed to and turn with the pinions 23′, 24′, 25′ and 26′ respectively, which latter pinions engage the sales or subtracting wheels. These adding and subtracting wheels, as well as the drums, are sleeved upon a stationary shaft Y. The adding and subtracting wheels just referred to, are turned in the same direction by the downward movement of the slides, but they act upon the drums in different directions by means of compound epicyclic gears. The subtracting wheels U, V, W, X are secured to the ends of sleeves $i$ (Fig. 6), mounted on the shaft Y, and having at their ends opposite to the subtracting wheels disks or flanges $k$ carrying the epicyclic pinions $l$, which mesh with an internal gear $m$ on the interior of the respective drums M, N, O, P. Each of the drums has such an internal gear $m$ at one end, and is supported at that end on the epicyclic pinions $l$. The other end of each drum has a flange $n$ extending to and bearing upon the sleeve $i$. Each of the adding wheels Q, R, S, T, carries a set of epicyclic pinions $o$ mounted on pins passing through the wheel and through a retaining plate $p$. Held between the adding wheel and the plate $p$ and encircling the epicyclic pinions $o$ is an internally toothed ring Z, which gears with the outer sides of the epicyclic pinions $o$, and is the stationary wheel of the compound epicyclic gearing. Meshing with the inner side of the pinions $o$ is a gear-wheel $q$, which is fixed to a sleeve upon which is a similar gear-wheel $r$, located outside of the retaining plate $p$. The gear-wheel $r$ for each set of gears engages with the inner sides of the epicyclic pinions $l$, which mesh with the drum operated by that set of gears.

It will be seen that if the ring Z and the subtracting wheel of one set of wheels are held stationary, the rotation of the adding wheel will give the drum a movement in the opposite direction to the adding wheel, through the double set of epicyclic pinions $o$, $l$, and gear-wheels $q$, $r$, while if the adding wheel and ring Z are held stationary, and the subtracting wheel is rotated, the drum will be given a movement in the same direction as the subtracting wheel, by means of the epicyclic pinions $l$; and that if both the adding and subtracting wheels move simultaneously, the drum will remain stationary. It will be seen that the adding wheel acts on the drum through two sets of epicyclic pinions, the second set being held stationary, $i.$ $e.$ revolution around a common axis, by the subtracting wheels, thus giving the drums a reverse direction of rotation; while the subtracting wheels act upon the drums through a single set of epicyclic pinions, which are given a movement of revolution by the subtracting wheels and a movement of rotation by the gear $r$ and rotate the drums in the same direction as the subtracting wheels. When both the adding and subtracting wheels are rotating at the same time, the epicyclic pinions $l$, having a movement of rotation given by the adding wheel and a movement about the common axis given by the subtracting wheel, will modify the effect upon the drum and cause the drum to take up a position which is the resultant of the movements of the two wheels. For a carrying device I employ the intermittently acting carrier of my Patent No. 484,814, the intermitting wheel of which engages with teeth on the drum of one order and turns the ring Z of the higher order of wheels in one direction or the other according to whether the carrying is one of addition or subtraction. The ring Z of the first order of wheels is held against turning by the arm $s$, secured at any suitable point to the frame-work. Each of the drums M, N, O, P has its flange $n$ extended to form a smooth circular outer rim $t$, which, at one point in its periphery, is provided with four teeth $u$, engaging with the teeth on the mutilated pinion $v$ which is one element of the carrying devices. The teeth $u$ engage the mutilated pinion and turn it in one direction as the drum passes from 0 to 9, and in the other direction as the drum passes from 9 to 0, the pinion being at other times locked against rotation by the smooth face of the rim $t$. Each of the mutilated pinions $v$ is mounted on a sleeve, carrying at its other end an ordinary pinion $w$, the other element of the carrying devices which meshes with the ring Z of the next higher order of wheels. The carrying devices lock the rings Z of the drums of the second, third and fourth orders against movement except when the mutilated pinions of the carrying devices are rotated. The movement of the ring Z modifies the effect which the epicyclic pinions $o$ and $l$ have on the drums with which they are connected. Each movement of a ring Z due to its carrying pinion is just sufficient to move the drum with which it is connected one-tenth of a revolution.

In the position of rest of the machine, the crosshead C stands at the lower limit of its movement, and the indicators show the last transaction, the drums of the computing mechanism indicating the change which the last customer received. For a new transaction, the proper keys are depressed, representing the amount of money paid in and the amount of the sale. The handle F is then turned, thus raising the crosshead C to its uppermost position and permitting the slides shifted in the last operation to return to their normal positions. All indicators will then show four ciphers along the line of indication, and the teeth $u$ on the smooth rims of the drums are close to the mutilated pinions $v$ of the carrying device, which pinions then stand opposite the figure "1" on the drums. The continued movement of the handle F moves the crosshead downwardly again, the pivoted dogs engaging notches in the slides determined by the depressed keys and carrying such slides down with the crosshead. The movement of the slides moves the drums of the computing mechanism. If a drum is first started by one of the sales or subtracting slides, it will move from 0 to 9, and will at once turn the mutilated pinion and turn the drum of the next higher order one-tenth of a revolution in the same direction subtracting one from the indication furnished by the latter drum. The movement of the drum in the other direction takes place when the crosshead is again lifted for another transaction and the wheels set back to the zero position; then the teeth $u$ engage the mutilated pinion when the drum moves from 9 to 0, turning the drum of the next higher order in the reverse direction, or that of adding one to its indication. The intermittently acting carrying device, it will be seen, serves to lock, or hold in a fixed position, the stationary wheel of the epicyclic gearing except when it acts to perform its carrying function, when it is turned in one direction or the other, and modifies the effect of the epicyclic gearing upon the drums. Considering the entire operation in a general way, the three actuators for one of the drums higher than the unit drum may be said to operate as follows: The adding and subtracting actuators act on the drum through a compound epicyclic gearing, involving two sets of epicyclic pinions, one set being given a motion of translation by the adding wheel, and the other set a motion of translation by the subtracting wheel, while the carrying actuator moves the stationary wheel, which acts as the fulcrum for the epicyclic pinions.

The operation of the change-making mechanism is controlled by the pins $x$ located upon the drums of the computing mechanism. The change is contained in coin tubes 34, which tubes are preferably secured together and located in the front part of the machine, and preferably held in position by spring catches 35 so as to be readily removable. The change is ejected from the bottom of the tubes by slides 32 which normally stand immediately behind the tubes (instead of under the tubes as described in my Patent No. 864,185, granted August 27, 1907) and are moved forward to eject the change and retracted into normal position by a series of expelling levers 27 which are actuated by the prime actuator to eject change and returned to normal position by springs 31. The expelling levers 27 are angle levers which are sleeved at their angles upon a shaft 28 carried by pivoted arms or links 29; the shaft and links forming a reciprocating frame carrying the expelling levers. This frame is given an upward movement by a cam 30 on shaft F', which engages with a projection on the arms 29 as seen in Fig. 2. This engagement of the cam to move the frame upward takes place during the last part of the rotation of shaft F', or in other words after the indicators, register and change computer have been actuated. When the frame carrying the expelling lever is raised, the short arms are brought into contact with the pins $x$ on the drums, which were moved into operative position by the automatic adjustment of the change computer, and during the continued upward movement of the frame the pins $x$ which are in engagement with the short arms of the expelling levers act as pivots for such levers and it will be seen that the long arms of the levers 27 will then be forced forward, carrying the coin slides with them, and thereby eject the proper amount of change. The coin slides and levers 27 are connected by links 33, and it will be seen that the levers 27 which do not engage with pins $x$ will move upward and are free to swing backward and raise the forward ends of links 33 and hence the coin slides connected with such links will remain stationary. As the cam 30 passes from under the projection on link 29, the frame is drawn downward by spring 31. During the downward movement, the short arms of the expelling levers which were moved forward to operate their respective coin slides will strike the stationary bar $x'$ which acts as a pivot for the levers during the downward movement of the frame, and whereby such levers will now be tilted backward and the actuated coin slides will be drawn backward from under the coin tubes and into normal position.

With the one cent, ten cent, and one dollar tubes, compound coin-expelling slides are employed. These slides are each composed of a sectional slide, composed of four sections, 36, 37, 38 and 39, the inner section being of the proper height to expel one coin, the next two coins, the next three coins, and the next four coins. These sections are connected with independent expelling levers, as shown, operated by different pins on the drums, so that a positive and certain result is attained. The coin tubes with which the compound slides coöperate are provided with adjustable sleeves or linings, as described in my former application, which are lifted by the slides by means of beveled lugs $a^2$ which the slides strike as they advance. To utilize twenty-five cent coins in making change, I provide the coin-expelling slide for the twenty-five cent tube with an expelling rib 40 (Fig. 1), which is thick enough to expel two coins at each operation. The lever operating the twenty-five cent slide is worked by pins on the tens drum N, which are so arranged that the twenty-five cent slide is operated for making change between fifty and seventy-five cents inclusive, while the fifty cent slide, which is operated by pins on the same drum and expels one coin at each movement, is used to make change between eighty cents and ninety-five cents inclusive. Since the twenty-five cent coin is made up of units and tens, it could not be used for making change singly without a combined action of the units and tens drums, which would result in complication, and hence I prefer to arrange the tens drum for expelling two quarters at a time and divide the change between fifty cents and a dollar between the twenty-five cent coins and the fifty cent coins.

The machine may be used in connection with a cash drawer 41 (Fig. 13), which is thrown open by a spring 42, and is held closed by a pivoted latch 43, which latch is connected by a wire with the shaft 28, so that when that shaft is lifted by the cams 30, the latch will be lifted and the drawer released. This would occur at the end of the complete operation of the machine. The cash drawer may be used when the coin tubes are not filled, or for making change in greater amounts than the expelling mechanism is provided to make, although the indicating mechanism may indicate the proper change. It is also evident that if the machine was used without the coin expelling devices, the cash drawer would become an essential adjunct.

It will be understood that the registering mechanism 44, 45, 46, is that of my Patent No. 455,111. The machine is also preferably provided with a shield 47 (Figs. 1 and 2), similar to that described in my former application, whose purpose is to hide the figures of the sales indicator until the movement of the machine is completed. The same shield or other shields of similar character may be employed to cover the figures of the paid-in indicator and the change indicator. Shield 47 is carried by arm $47^a$, secured to a rock-shaft $47^b$, operated by the vertical rod 48, having a foot $48^a$, which is engaged by a pin 49 on the rock-shaft D, the pin striking the foot and lifting it as the machine completes its movement.

Referring now to Figs. 14, 15 and 16, the purchase-indicating wheels E, the paid-in indicating wheels L, and the change indicating wheels 51 are located at the top of the machine above the key-board. The sales slides 1, 2, 3, 4, and the paid-in slides 11, 12, 13 and 14 are arranged alternately, and the sales keys H and paid-in keys K are also arranged alternately on the key-board, the finger pieces being preferably distinguished by difference in color or shape or both. The sales and paid-in slides, instead of being curved bars carried by a curved race, are carried by segments 52 mounted upon a shaft 53, on which is also mounted the arm $a$ carrying the cross-head C. There are eight of these segments 52, and they are moved in one direction by the cross-head, as are the curved slides in the form of machine already described, and are drawn independently in the other direction by springs 54, one for each segment. The segments carry on their front sides not only the ratchet teeth for engaging the pivoted dogs carried by the crosshead, but also the gear teeth similar to the gear teeth of the curved slides for engaging the pinions of the computing mechanism, which, in the form of machine shown in Figs. 14, 15 and 16, is used only to make the change. The rear sides of the segments are provided with other sets of gear teeth 55, which mesh with wheels 56, 57, sleeved upon shaft 58. The wheels 56 engage the teeth on the purchase segments 1, 2, 3, 4, and are connected by intermediate wheels 58 with the gears 59 attached to the sales or purchase indicator wheels E. The wheels 56 are connected by pawls and ratchets with other wheels 61, mounted adjacent to them, which wheels 61 engage register wheels 62 (Fig. 15) for registering the amount of the sales. The registering mechanism may be that of my Patent No. 484,814. The wheels 57 operated by the paid-in slides 11, 12, 13 and 14 are connected, through two sets of wheels 63 and 64, with gears 65 on the paid-in indicator wheels L. The wheels 63 and 58 are respectively the adding and subtracting wheels of a computing mechanism similar to that which has already been described for indicating and making change, which is clearly shown in Figs. 5, 6 and 7. The respective constructions of these different computing mechanisms differ only in that the one first described controls both the money changer and acts as well as an indicator, while the construction shown in Figs. 14, 15 and 16 acts as an indicator alone. As these devices have already been fully described and shown, no further description and illustration is thought necessary.

What I claim is:

1. In a machine of the class described, the combination with devices for indicating the amount of a sale, mechanism for operating the same, devices for indicating the amount of money tendered in payment, mechanisms for operating said devices, keys for controlling said mechanisms, and a common operating means for said mechanisms.

2. In a machine of the class described, the combination with devices for indicating the amount of a sale, mechanism for operating the same, devices for indicating the amount of money tendered in payment, mechanism for operating said devices, keys for controlling said mechanism, and means for simultaneously operating said mechanisms.

3. In a machine of the class described, the combination with indicators for the amount of sales, of indicators for the amount tendered, independent controlling devices for the respective indicators and a common operating means for said indicators.

4. In a machine of the class described, the combination with change selecting mechanism, and means for differentially positioning the same, of change delivering devices, and levers for operating said devices, a pivoted frame carrying said levers, and means for raising said frame to cause said lever to engage the selecting mechanism.

5. In a machine of the class described, the combination with change selecting mechanism, and means for differentially adjusting the same, of change delivering mechanism, levers for operating said delivering mechanism, a frame carrying said levers, and means for raising said frame to first cause the levers to engage and be controlled by said selecting mechanism and to then rock said levers to cause delivery of change.

6. In a machine of the class described, the combination with change selecting mechanism, and means for differentially adjusting the same, of change delivering mechanism, bell crank levers for operating said delivering mechanism, and means for first moving said levers as a whole until arms thereof engage the selecting mechanism and then rocking said levers to cause operation of the change delivering mechanism.

7. In a machine of the class described, the combination with change selecting mechanism, and keys for differentially positioning the same, of change delivering mechanism, levers adapted to be controlled by said selecting mechanism and constructed to operate said change delivering mechanism, and a main operating mechanism for actuating said selecting mechanism and said levers.

8. In a machine of the class described, the combination with devices for indicating the amount of a sale, mechanism for operating the same, devices for indicating the amount of money tendered in payment, mechanism for operating said devices, keys for controlling said mechanisms, a change indicator, mechanism for controlling said indicator controlled by the above mentioned mechanisms.

9. In a machine of the class described, the combination with devices for indicating the amount of a sale, mechanism for operating the same, devices for indicating the amount of money tendered in payment, mechanism for operating said devices, keys for controlling said mechanism, a change indicator, mechanism for operating said indicator, and means for simultaneously operating said mechanisms.

10. In a machine of the class described, the combination with devices for indicating the amount of a sale, mechanism for operating the same, devices for indicating the amount of money tendered in payment, mechanism for operating said devices, keys for controlling said mechanism, a change indicator, mechanism for operating said indicator, and an actuator common to all of said mechanisms.

11. In a machine of the class described, the combination of a sales indicating mechanism, actuators therefor, sales keys for controlling said actuators, paid in keys, actuating means controlled by said paid-in keys, a computing mechanism for indicating the change, and means whereby said computing mechanism is operated by the simultaneous action of the sales and paid-in actuators.

12. In a machine of the class described, the combination of a sales indicating mechanism, actuators therefor, sales keys for controlling said actuators, a paid-in indicating mechanism, actuators therefor, paid-in keys for controlling said actuators, a computing mechanism for indicating the change, and means whereby said computing mechanism is operated by the simultaneous action of the sales and paid-in actuators.

13. In a machine of the class described, the combination with a paid-in indicator, of a sales indicator, mechanisms for operating the paid-in and sales indicators, a change indicator, means for operating the same controlled by the above mentioned operating mechanisms, and a series of keys for controlling the said operating mechanisms.

14. In a machine of the class described, the combination with a paid-in indicator, of a sales indicator, mechanisms for operating said indicators, a change indicator, means for communicating movement to the change indicator controlled by the operating mechanisms of the paid-in and sales indicators, and an operating member for imparting movement to said operating means.

15. In a machine of the class described, the combination with a paid-in indicator, of a sales indicator, mechanisms for operating said indicators, a change indicator, means for operating the latter controlled by the aforesaid operating mechanisms, a movable member for actuating said means, and a series of keys for controlling said mechanisms.

16. In a machine of the class described, the combination with a paid-in indicator, of a sales indicator, a change indicator, controlling devices for the paid-in and sales indicators, a common operating device for these two latter indicators, and means for controlling the change indicator from the paid-in and sales indicators.

17. In a machine of the class described, the combination with setting devices representing the amount of money paid-in, other setting devices representing the amount of the sale, a change indicator, an operating mechanism for said latter indicator, and operating connections between said operating mechanism and the said setting devices whereby the latter simultaneously control the movements of the operating mechanism.

18. In a mechine of the class described, the combination with a series of keys representing the amounts of sales, a second series of keys representing the amounts paid in, a change indicator, and means for giving said indicator a single movement to set it to a position representing the difference between the amounts set up on the respective series of keys.

19. In a machine of the class described, the combination with a series of movable sales indicating elements, of a series of movable paid-in indicating elements, a change indicating element, and a compound epicyclic gearing through which the paid-in and sales elements control the change element.

20. In a machine of the class described, the combination with an oscillating driving member, of driven members arranged to be coupled thereto, a series of keys for controlling the coupling operations of a part of said driven members and representing the amounts of sales, another series of keys controlling the coupling operations of the remainder of said driven members and representing amounts paid in, and a change device arranged to be operated simultaneously by the driven members so as to occupy a position representing the difference between the movements of said driven members.

21. In a machine of the class described, the combination with sales, amount tendered and change indicators, of operating devices for the change indicators, and means controlling said operating devices according to the movements of the sales and amount tendered indicators.

22. In a machine of the class described, the combination with devices adjustable for an amount of sale, of devices adjustable for an amount of deposit, change selecting devices, and means whereby the movement of the sales and deposit devices simultaneously control the change selecting devices.

23. In a machine of the class described, the combination of a machine having minuend indicator mechanism, a subtrahend indicator mechanism, a remainder indicator mechanism, a bank of keys for setting the minuend indicator mechanism, a separate bank of keys for setting the subtrahend indicator mechanism, and means whereby the operation of the minuend and subtrahend indicating mechanism may operate to effect the desired adjustment of the remainder indicating mechanism.

24. In a machine of the class described, the combination of a machine for temporarily indicating value received, value retained, and value returned in the form of change in each special transaction, and consisting of a minuend indicator mechanism, a subtrahend indicator mechanism, a remainder indicator mechanism, means whereby the operation of the minuend and subtrahend indicators may operate the remainder indicator and means for readjusting the several indicator mechanisms to the starting point on the beginning of a new indication.

25. In a machine of the class described, the combination with a series of keys representing the amount of sales, a second series of keys representing the amounts paid in, a change indicator, and means for directly setting said indicator to a position representing the difference between the amounts set upon the respective series of keys.

26. In a machine of the class described, the combination with devices adjustable in accordance with a deposited amount, of devices adjustable in accordance with an amount of purchase; and indicating mechanism controlled by both devices, and constructed to be adjusted directly from a normal zero position to a position indicating the difference between said two amounts.

27. In a machine of the class described, the combination with mechanism adjustable in accordance with a deposited amount, of mechanism adjustable in accordance with an amount of purchase; and an indicating mechanism controlled by both said mechanisms and constructed to be adjusted in one direction or the reverse directly to a position indicating the difference between said two amounts.

28. In a machine of the class described, the combination with mechanism positioned in accordance with a deposited amount, of mechanism adapted to be positioned in accordance with an amount of purchase; and an indicating mechanism controlled by both said mechanisms and constructed to be adjusted in a direction depending on the purchase and deposit amounts.

29. In a machine of the class described, the combination with mechanism adapted to be positioned in accordance with a deposited amount, of mechanism adapted to be adjusted in accordance with an amount of purchase, and indicating mechanism automatically adjusted by the movement of said mechanisms directly to a position depending on the difference between said two amounts.

30. In a machine of the class described, the combination with mechanism adapted to be adjusted in accordance with a deposited amount, of mechanism adapted to be adjusted in accordance with an amount of purchase, and indicating mechanism controlled by both said mechanisms and constructed to move in a direction according with the larger of the two amounts to a position indicating the difference between said two amounts.

31. In a machine of the class described, the combination in a sales indicating or registering machine, with devices for indicating the amount of a sale, mechanism for operating the same, devices for indicating the amount of money tendered in payment, mechanism for operating said devices, keys for controlling said mechanisms, a change indicator, mechanism for operating said indicator controlled by the above mentioned operating mechanisms and a change making mechanism movable in accordance with the amount exhibited on the change indicator.

32. In a machine of the class described, the combination with devices for indicating the amount of a sale, mechanism for operating the same, devices for indicating the amount of money tendered in payment, mechanism for operating said devices, keys for controlling said mechanisms, a charge indicator, mechanism for operating said indicator, a change making mechanism, and means for simultaneously operating said mechanisms.

33. In a machine of the class described, the combination with devices for indicating the amount of a sale, mechanism for operating the same, devices for indicating the amount of money tendered in payment, mechanism for operating said devices, keys for controlling said mechanisms, a charge indicator, mechanism for operating said indicator, a change making mechanism, and an actuator common to all said mechanisms.

34. In a machine of the class described, the combination with a paid-in indicator, of a sales indicator, mechanisms for operating said indicators, a change indicator, a change maker, and means for operating the change indicator and change maker controlled by the operating mechanism for the paid-in and sales indicators.

35. In a machine of the class described, the combination with a paid-in indicator, of a sales indicator, mechanism for operating said indicators, a change indicator, a change maker, means for operating the change indicator and change maker controlled by the aforesaid operating mechanisms, and a movable member for operating said means.

36. In a machine of the class described, the combination with a paid-in indicator, of a sales indicator, a change indicator, means for controlling the sales and paid-in indicators, a change maker and means for automatically adjusting the change indicator and change maker to the difference between amounts indicated on the paid in and sales indicators.

37. In a machine of the class described, the combination with a series of keys representing the amounts of sales, a second series of keys representing the amounts paid-in, a change selector, means for setting the latter by a single movement to a position representing the difference between the operated keys in the two series and change ejecting mechanism controlled by said selector.

38. In a machine of the class described, the combination with sales, amount tendered and change indicators, a change maker and means controlling the movements of the change indicator and change maker according to the adjustments of the sales and amount tendered indicators.

39. In a machine of the class described, the combination with indicators for the amount of sale, of indicators for the amount tendered, a money changer, and operating means intermediate the money changer and the indicators.

40. In a machine of the class described, the combination with mechanism adapted to be adjusted in accordance with a deposited amount, of mechanism adapted to be adjusted in accordance with an amount of purchase, change selecting mechanism controlled by both said mechanisms and adapted to be adjusted by the same directly to a position indicating the difference between said two amounts, and change delivering mechanism, controlled by said selecting mechanism.

41. In a machine of the class described, the combination with mechanism adapted to be adjusted in accordance with a deposited amount, mechanism adapted to be adjusted in accordance with an amount of purchase, and means for simultaneously adjusting said two mechanisms; of change selecting mechanism controlled by said two mechanisms, and adapted to be adjusted by said mechanisms to a position depending on the difference between said two amounts, and change delivering means controlled by said selecting mechanism.

42. In a machine of the class described, the combination with mechanism adjustable in accordance with a deposited amount and mechanism adjustable in accordance with an amount of purchase, of change selecting means rigidly connected to both said mechanisms, and a common operating means for both said mechanisms.

43. In a machine of the class described, the combination with mechanism adapted to be positioned in accordance with a deposited amount, mechanism adapted to be positioned by an amount of purchase, and means for operating said deposit and purchase mechanisms simultaneously; of change selecting mechanism connected rigidly to both said mechanisms and adjusted thereby.

44. In a machine of the class described, the combination with mechanism adapted to be positioned in accordance with a deposited amount, mechanism adapted to be positioned in accordance with an amount of purchase, and change selecting mechanism; of epicyclic gearing connecting said selecting mechanism to both said deposit and purchase mechanisms.

45. In a machine of the class described, the combination with mechanism adapted to be positioned in accordance with an amount of purchase, mechanism adapted to be positioned in accordance with a deposited amount, and change selecting mechanism; of an epicyclic gearing connecting said selecting mechanism to both said deposit and purchase mechanisms, and transfer devices acting on said gearing.

46. In a machine of the class described, the combination with mechanism adapted to be positioned in accordance with a deposited amount, and mechanism adapted to be positioned in accordance with an amount of purchase; of change selecting means positively connected to both said mechanisms, and means for adjusting said mechanisms simultaneously.

47. In a machine of the class described, the combination with mechanism adapted to be positioned in accordance with a deposited amount, and mechanism adapted to be positioned in accordance with an amount of purchase; of change selecting means positively connected to both said mechanisms by epicyclic gearing, and means for adjusting said mechanisms simultaneously.

48. In a machine of the class described, the combination with mechanism adapted to be positioned in accordance with a deposited amount, and mechanism adapted to be positioned in accordance with an amount of purchase; of means for simultaneously adjusting said mechanisms, and a change selecting means connected to both said mechanisms and arranged to be moved by either of said mechanisms, but to remain stationary if both move at once.

49. In a machine of the class described, the combination with mechanism adapted to be positioned in accordance with a deposited amount, and mechanism adapted to be positioned in accordance with an amount of purchase, of a change selecting means positively connected to both said mechanisms and constructed to remain stationary while both mechanisms move, but to be actuated by either mechanism moving alone.

50. In a machine of the class described, the combination with a machine adapted to be positioned in accordance with a deposited amount, and mechanism adapted to be positioned in accordance with an amount of purchase; of change selecting means positively connecting to both said mechanisms and constructed to be adjusted thereby directly in a direction determined by the mechanism given the greater extent of adjustment.

51. In a machine of the class described, the combination with change selecting mechanism comprising separate denominational elements, of two way acting transfer devices between said denominational elements.

52. In a machine of the class described, the combination with a change selecting mechanism comprising separate denominational elements, movable in opposite directions for addition and subtraction of transfer devices operating from a lower denomination to a higher denomination in either direction of movement of said elements.

53. In a machine of the class described, the combination with change selecting mechanism, comprising separate denominational elements; of two way acting transfer devices between said elements, including epicyclic gearing.

54. In a machine of the class described, the combination with change selecting mechanism comprising separate denominational elements, of epicyclic gearing connecting said elements including a normally fixed gear, and means for moving said fixed gear in either direction to cause a transfer from one denominational element to another.

55. In a machine of the class described, the combination with change selecting mechanism, and manipulative devices for differentially positioning same; of change delivering mechanism, and means controlled by said selecting mechanism for actuating said delivering mechanism; and a main operating mechanism for actuating said selecting mechanism and the actuating means for said delivering mechanism.

56. In a machine of the class described, the combination with change selecting mechanism, and manipulative devices for differentially positioning same, of change delivering mechanism and means for actuating same controlled by said selecting mechanism, and a common operating mechanism serving to first actuate said selecting mechanism and then operate the actuating means for said delivering mechanism.

57. In a machine of the class described, the combination with a computing mechanism, of sales actuators, paid in actuators and carrying actuators, operating simultaneously upon the computing mechanism, change selecting devices operated by said computing mechanism, and a change-expelling device controlled by said change selectors.

58. In a machine of the class described, the combination with a computing mechanism, of sales actuators, paid-in actuators and carrying actuators, acting upon said computing mechanism simultaneously, change selectors moved by said computing mechanism, and coin expelling slides and levers controlled by said change selectors.

59. In a machine of the class described, the combination with sales indicating mechanism, of a change making mechanism, and means connected with both said indicating mechanism and said change making mechanism whereby both mechanisms are operated by the same movement.

60. In a machine of the class described, the combination with a computing mechanism carrying change selecting projections, a movable frame carrying coin expelling levers, coin expelling devices connected to said levers, and a hand actuated device for raising the frame carrying the levers to bring the latter into contact with the selecting projections, whereby said levers are operated to expel coins.

61. In a machine of the class described, the combination with a computing mechanism carrying change selecting pins, of angular coin expelling levers, a moving frame carrying such levers, coin expelling slides connected to said levers, and a rotating shaft and cam for lifting said frame to engage said levers with the change selecting pins.

62. In a machine of the class described, the compound coin-expelling slides made in sections arranged to move one within the other, in combination with separate actuators for said sections.

63. In a machine of the class described, the combination with change computing mechanism arranged in denominational sections, of change selectors movable with said computing mechanism, and change ejectors for different values of money controlled by said selectors, the change ejector for twenty five cent coins being constructed to eject two coins when operated and being controlled from the dimes section of the computing mechanism.

64. In a machine of the class described, the combination with sales indicating mechanism, of a change indicating mechanism, a common actuator for said mechanisms and a cash drawer having a lock which is released by the indicator movement.

65. In a machine of the class described, the combination of devices for indicating the amount of a sale, devices for indicating the amount of money tendered in payment, a key board arranged below said devices, and coöperating actuating mechanism for said devices, controlled by the keys of the key-board.

66. In a machine of the class described, the combination of devices for indicating the amount of a sale, devices for indicating the amount of money tendered in payment, a key-board arranged below said devices, and actuating mechanism for said devices, coöperating with the keys of the key-board.

67. In a machine of the class described, the combination with sales indicating mechanism, of a crosshead operating said mechanism and having a reciprocating movement, keys controlling the connection of said crosshead with said mechanism, and means for giving said crosshead a lateral motion at the ends of its reciprocating motion whereby said keys act upon the crosshead in one direction only of its reciprocating movement.

68. In a machine of the class described, the combination with a registering mechanism, of a crosshead operating said mechanism, means for giving said crosshead a reciprocating movement, keys for controlling the connection of said crosshead with said registering mechanism, means for giving said crosshead a lateral motion at the end of its reciprocating motion whereby said keys act upon the crosshead in one direction only of its reciprocating movement, and a device for preventing backward movement of the means for imparting the reciprocating movement to the crosshead.

69. In a machine of the class described, the combination with sales indicating mechanism, of a crosshead operating said mechanism and having a reciprocating movement and also a lateral movement at each end of its reciprocating movement whereby the crosshead occupies a different position when moving in one direction from what it does when moving in the other direction, movable dogs carried by said crosshead for engaging the actuators of the sales indicating mechanism, and keys whose stems engage the dogs when the crosshead moves in one direction and avoids said dogs when the crosshead is moved in the other direction.

70. In a machine of the class described, the combination with sales indicating mechanism and toothed slides for actuating said mechanism, of a crosshead having movable dogs engaging said slides, said crosshead having a reciprocating motion and a lateral motion at each end of the reciprocating motion, keys moving said dogs when depressed, and inclines and slides on the crosshead coöperating with said keys.

71. In a machine of the class described, the combination with the sales indicator, the toothed slides, crosshead, movable dogs and controlling keys, of a rock shaft carrying the crosshead and a wedge operated by the movement for giving the rock-shaft and crosshead a lateral motion.

72. In a machine of the class described, the combination with the crosshead and rock shaft, of a rotating handle shaft connected with the rock shaft by a pitman, a sliding wedge moving the rock-shaft and crosshead laterally, a bar carrying said wedge, a curved fork on said bar, and an arm on the rotating handle shaft engaging said curved fork and moving said bar.

73. In a machine of the class described, the combination with a driving member, of driven members, means for coupling the driving member to the driven members, keys for controlling said coupling means, and devices for moving said coupling means out of the paths of the keys when said means are moving in one direction so that they will not be engaged by the keys and operated.

74. In a machine of the class described, the combination with indicating drums, adding and subtracting elements for operating upon said drums in opposite directions and a compound epicyclic gearing connecting said elements and drums.

75. In a machine of the class described, a computing mechanism having in combination rotating drums and adding and subtracting devices arranged to act upon said drums simultaneously.

76. In a machine of the class described, the combination with indicators, for the sales and amounts tendered, of a register, an operating mechanism for actuating the register according to the amounts indicated by the sales indicators alone.

77. In a machine of the class described, the combination with devices adjustable for an amount of sale, of devices adjustable for an amount of purchase, common operating means for said devices, a change indicator connected for operation by both said devices jointly and accounting devices controlled by the sales devices alone.

78. In a machine of the class described, the combination with keys for deposit and purchase amounts, of elements separately positioned by said keys, a common operating mechanism for adjusting said elements under control of said keys, and a change computing device actuated by said elements.

79. In a machine of the class described, in combination indicating drums, adding wheels moving said drums in one direction, subtracting wheels moving the drums in the other direction, and a carrying device carrying from drums of a lower to drums of a higher order and operating in either direction, the said adding wheels, subtracting wheels and carrying device being so constructed as to permit simultaneous action without interference.

80. In a machine of the class described, in combination indicating drums, adding and subtracting wheels operating upon said drums in opposite directions, and a compound epicyclic gearing connecting said drums and wheels.

81. In a machine of the class described, in combination indicating drums, adding and subtracting wheels, a compound epicyclic gearing through which said adding and subtracting wheels act upon the drum in opposite directions, and an intermittent carrying device connecting each drum of one order with the stationary wheels of the compound epicyclic gearing of the drum of the next higher order.

82. In a machine of the class described, in combination, controlling drums, adding elements moving said drums in one direction, subtracting elements moving the drums in the other direction, and carrying devices between the drums for operation in either direction; all of said devices being arranged for simultaneous action without interference.

83. In a machine of the class described, in combination controlling drums and adding and subtracting elements operating upon said drums in opposite directions and simultaneously.

84. In a machine of the class described, the combination with operating devices representing the amounts of sales, of other operating devices representing the amounts paid in, change devices arranged to be controlled by the simultaneous movements of the before mentioned devices, and transfer means between the respective change devices adapted to operate simultaneously with the movements imparted by the aforesaid sales and paid in operating devices.

85. In a machine of the class described, the combination with a series of sales indicators, of a series of paid in indicators, a common operating device for said indicators, and a flash for all of said indicators arranged to be operated by the common operating device.

86. In a machine of the class described, the combination with a series of cash indicators, a series of paid-in indicators, and a common flash for the same.

87. In a machine of the class described, the combination with a series of cash indicators, a series of paid in indicators, a common operating mechanism for said indicators, and a flash arranged to be operated by the common operating mechanism.

88. In a machine of the class described, the combination with a series of sales indicators, a series of paid in indicators and a series of adding elements, and a flash arranged to simultaneously disclose the sales and paid in indicators without disclosing the adding elements, and also, when desired, to disclose said adding elements.

89. An indicating and registering machine comprising a set of drums indicating the value of the minuend, a set of drums indicating the value of the subtrahend, and two sets of key banks, one corresponding to the drums indicating the minuend, the other to the drums indicating the subtrahend.

90. In a machine of the class described, the combination with indicators for displaying the amount purchased and the amount tendered in payment thereof, of an operating mechanism therefor, devices for determining the amounts to be displayed by the indicators upon an operation of the operating mechanism, and an additional indicator controlled by the previously mentioned indicators for displaying the amount of change.

91. In a machine of the class described, the combination with indicators for displaying the amount purchased, amount tendered and the amount of change, of means common thereto and for simultaneously operating said indicators to display the various amounts.

92. In a machine of the class described, the combination with indicators for displaying the amount purchased, amount tendered and the amount of change, of means common thereto and for simultaneously operating said indicators to display the various amounts and a change making mechanism controlled by the change indicator.

93. In a machine of the class described, the combination with a reciprocatory actuating member, of operating mechanism therefor, and means controlled by the operating mechanism for moving said member laterally at each end of its reciprocatory movement.

94. In a machine of the class described, the combination with a reciprocatory actuating member movable in different planes, of operating mechanism therefor, differentially movable elements, and manipulative devices for connecting the actuating member and movable elements while said member is moving in one plane but not while it is moving in the other.

95. In a machine of the class described, the combination with a reciprocatory actuating member movable in different planes, of operating mechanism therefor, differentially movable elements, manipulative devices for connecting the actuating member and movable elements while said member is moving in one plane but not while it is moving in the other, and means controlled by the operating mechanism for shifting said member into its different planes of movement.

96. In a machine of the class described, the combination with a computing mechanism comprising a plurality of accounting elements movable in different directions, of means for simultaneously actuating said elements in either direction, and two way acting transfer devices for imparting a transfer movement to the elements during the simultaneous operation of said elements.

97. In a machine of the class described, the combination with a computing mechanism comprising a plurality of accounting elements movable in different directions, of means for simultaneously actuating said elements in either direction, and two way acting transfer devices for imparting a transfer movement to said elements in either direction of movement thereof.

98. In a machine of the class described, the combination with a computing mechanism comprising a plurality of accounting elements, a set of actuators for simultaneously operating said elements in one direction to add thereto, a second set of actuators for simultaneously operating the elements in an opposite direction to subtract therefrom, and a single set of transfer devices for imparting a transfer movement to the elements during the simultaneous operation of said elements in either direction.

99. In a machine of the class described, the combination with a computing mechanism comprising a plurality of accounting elements, a set of actuators for simultaneously operating said elements in one direction to add thereto, a second set of actuators for simultaneously operating the elements in an opposite direction to subtract therefrom, manipulative devices controlling the movement of each set of actuators, and a single set of transfer devices for imparting a transfer movement to the elements during the simultaneous operation of said elements in either direction.

This specification signed and witnessed this 26 day of Feb'y 1896.

FRANCIS C. OSBORN.

Witnesses:
GEORGE MAITLAND,
THOMAS J. TULLY.